No. 763,470.                                    Patented June 28, 1904.

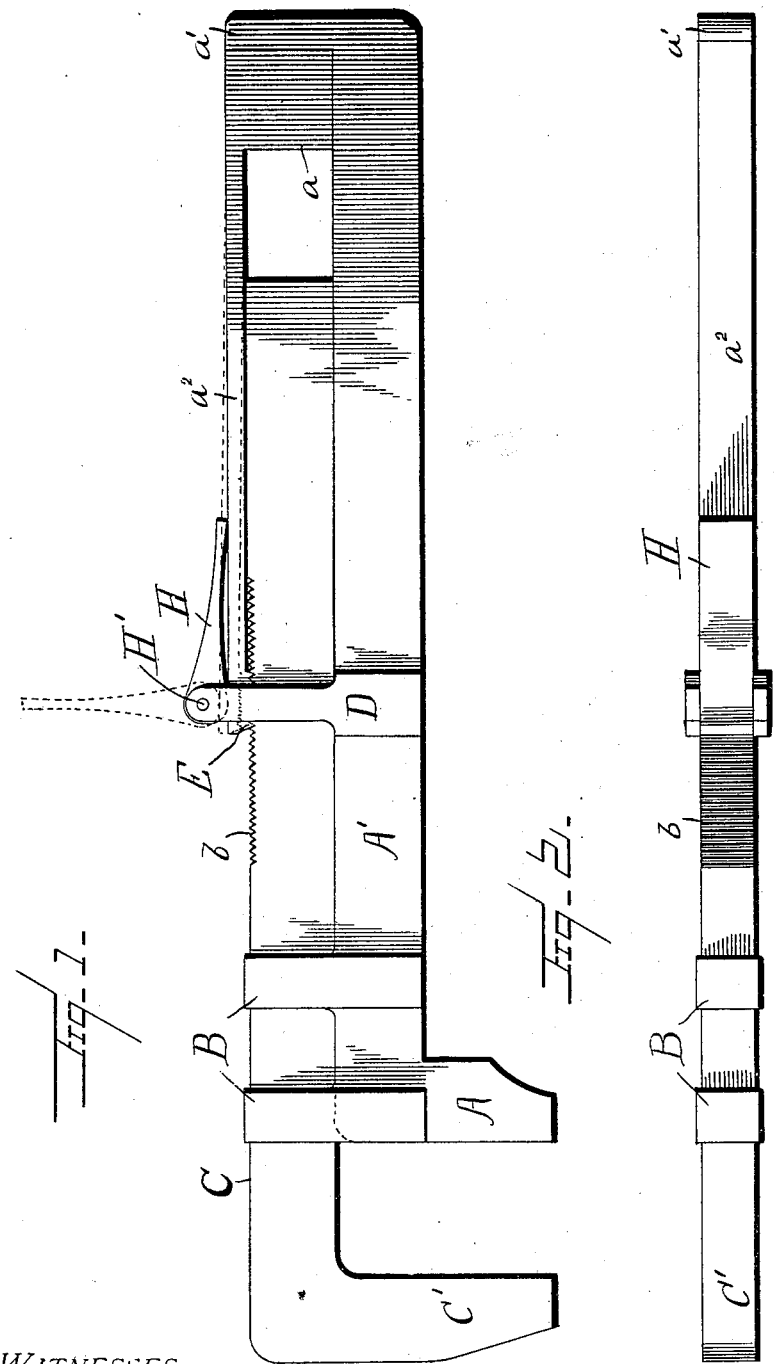

UNITED STATES PATENT OFFICE.

ALBERT DELTHA ERB, OF HUBBARD, OREGON.

SLIDING-JAW WRENCH.

SPECIFICATION forming part of Letters Patent No. 763,470, dated June 28, 1904.

Application filed March 5, 1904. Serial No. 196,729. (No model.)

*To all whom it may concern:*

Be it known that I, ALBERT DELTHA ERB, a citizen of the United States, residing at Hubbard, in the county of Marion and State of Oregon, have invented certain new and useful Improvements in Sliding-Jaw Wrenches; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in sliding-jaw wrenches; and the object of the invention is to produce a simple and efficient wrench which may be readily adjusted to engage different sized nuts and other objects and securely held in an adjusted position by means of a cam-lever which is designed to engage and frictionally hold a dog in engagement with teeth upon the shank portion of the movable jaw.

The invention consists, further, in various details of construction and in combinations and arrangements of parts, which will be hereinafter fully described and then specifically defined in the appended claim.

My invention is illustrated in the accompanying drawings, which, with the letters of reference marked thereon, form a part of this application, and in which drawings similar letters of reference indicate like parts in the views, in which—

Figure 1 is a side elevation of my improved wrench. Fig. 2 is a rear view of the wrench.

Reference now being had to the details of the drawings by letter, A designates a fixed jaw having a shank portion A', and B designates straps or loops which are made, preferably, integral with the shank portion of the jaw A and through which the shank portion C of the sliding jaw C' is adapted to work. Secured to the rear end of the shank portion of the fixed jaw is a plate $a$, held to said shank portion by means of a plate $a'$, and projecting from the plate $a$ is a flexible arm $a^2$, forming a dog with teeth E at its free end, which are designed to engage the teeth $b$, formed upon the outer longitudinal edge of the shank portion C of the sliding jaw. Projecting from the opposite faces of the shank portion A' of the fixed jaw are two arms D, and between which the shank portion of the sliding jaw C has a longitudinal movement. A cam-lever H is pivotally mounted upon a pin H', carried near the ends of the arms D, and is so positioned that when the handle of said cam member is turned in the position shown in the drawings the teeth at the end of said flexible arm $a^2$ may be securely locked to the teeth upon the outer edge of the shank portion C, thereby holding the two jaws in an adjusted position.

In operation when the cam member is thrown away from the flexible arm $a^2$ the teeth thereon are normally out of engagement with the teeth of the shank portion of the movable jaw, and the latter is free to be moved to adjust the wrench as may be desired, and when the proper adjustment is had the lever is thrown rearward, so that the cam portion thereof will contact with said flexible arm and force the teeth carried thereby into engagement with the teeth on the shank portion C, thereby securely holding the jaws in adjusted positions. The movement of the shank portion of the movable jaw is limited in one direction by coming in contact with the end of the plate $a$, as will be observed by reference to the drawings.

While I have shown a particular detailed construction of apparatus illustrating my wrench, it will be understood that I may make alterations, if desired, in the detailed construction of the same without in any way departing from the spirit of the invention.

Having thus fully described my invention, what I claim as new, and desire to secure by Letters Patent, is—

A sliding-jaw wrench comprising a jaw A with shank portion A', straps B projecting respectively, from said jaw and shank portion, a jaw C' with shank portion passing through said straps, a plate $a$ secured to the edge of the shank portion A' and also to a projection therefrom and provided with a flexible arm $a^2$, teeth upon the end of said flexible arm adapted to engage teeth upon the shank portion of the jaw C', arms D projecting from the shank portion of the jaw A, and serving as guides for the shank portion of the jaw C' and said flexible arm, a pin mounted in said arm D, and a cam-lever pivotally mounted on said pin and adapted to bear against said flexible arm, as set forth.

In testimony whereof I hereunto affix my signature in presence of two witnesses.

ALBERT DELTHA ERB.

Witnesses:
W. C. GILMORE,
O. L. COLDREN.